United States Patent
Takeuchi et al.

[11] Patent Number: 6,083,645
[45] Date of Patent: Jul. 4, 2000

[54] SECONDARY BATTERY USING SYSTEM AND MATERIAL FOR NEGATIVE ELECTRODE OF SECONDARY BATTERY

[75] Inventors: Seiji Takeuchi, Hitachiota; Hidetoshi Honbo, Hitachi; Takeo Yamagata, Takahagi; Tatsuo Horiba, Hitachi; Yasushi Muranaka, Hitachinaka, all of Japan

[73] Assignee: Hitachi, Ltd., Tokyo, Japan

[21] Appl. No.: 09/156,387

[22] Filed: Sep. 18, 1998

Related U.S. Application Data

[63] Continuation of application No. 08/595,246, Feb. 1, 1996, abandoned.

[30] Foreign Application Priority Data

Feb. 2, 1995 [JP] Japan .................................. 7-015676

[51] Int. Cl.[7] .................................................. H01M 4/58
[52] U.S. Cl. ..................................... 429/231.8; 429/231.4
[58] Field of Search ........................... 429/231.4, 231.8; 180/65.1, 65.3

[56] References Cited

U.S. PATENT DOCUMENTS

| | | | |
|---|---|---|---|
| 5,187,035 | 2/1993 | Miyabayashi et al. | 429/231.95 X |
| 5,370,711 | 12/1994 | Audit et al. | 29/623.1 |
| 5,401,598 | 3/1995 | Miyabayashi et al. | 429/231.95 X |
| 5,501,292 | 3/1996 | Kawashima et al. | 180/220 |
| 5,549,172 | 8/1996 | Mutoh et al. | 180/65.1 |
| 5,656,394 | 8/1997 | Koksbang et al. | 429/194 |

FOREIGN PATENT DOCUMENTS

| | | |
|---|---|---|
| 2-121258 | 5/1990 | Japan . |
| 4-259764 | 9/1992 | Japan . |
| 5-82171 | 4/1993 | Japan . |
| 5-286763 | 11/1993 | Japan . |
| 6-318454 | 11/1994 | Japan . |
| 6-349482 | 12/1994 | Japan . |

*Primary Examiner*—Maria Nuzzolillo
*Assistant Examiner*—J. O'Malley
*Attorney, Agent, or Firm*—Antonelli, Terry, Stout & Kraus, LLP

[57] ABSTRACT

A lithium secondary battery suitable for use as a power source for a secondary battery using system such as an electric automobile, motor bicycle or portable equipment includes a negative electrode (17) composed of a carbon material including carbon particles carrying fine particles of a metal which forms an alloy with lithium. The carbon particles have a face-to-face dimension which is 3.354 to 3.369 Å and a crystal grain size in a C-axis direction which is equal to or greater than 300 Å. The metal forming an alloy with lithium has a particle size which is equal to or smaller than 1000 Å. With the use of the charge/discharge capacity of an alloy of the metal and lithium, a value exceeding the theoretical capacity 372 mAh/g of graphite can be obtained. The lithium secondary battery is capable of discharge with an output energy density equal to or higher than 350 W/kg.

8 Claims, 2 Drawing Sheets

SECONDARY BATTERY USING SYSTEM AND MATERIAL FOR NEGATIVE ELECTRODE OF SECONDARY BATTERY

This is a continuation of application Ser. No. 08/595,246, filed Feb. 1, 1996, now abandoned.

BACKGROUND OF THE INVENTION

1. Field of the Invention

The present invention relates to a negative electrode for lithium secondary battery and a lithium secondary battery using the same, and more particularly to a negative electrode for lithium secondary battery which has a large discharge capacity, a large output density and an excellent cycle characteristic. The lithium secondary battery is applied as a power source for electric automobile or motor bicycle, a memory backup power source, or a driving power source for portable equipment.

2. Description of Related Art

The negative electrode of the conventional lithium secondary battery is made of a lithium metal or an alloy such as Li-Al, Li-Pb or the like. However, such a secondary battery has the problems including the short-circuiting of opposite electrodes caused by the deposition of resin-like lithium, a short cycle life and a low energy density. Recently, an active study of the use of a carbon material for a negative electrode has been prosecuted in order to solve those problems. The references include, for example, JP-A-5-299073 and JP-A-2-121258. In the JP-A-5-299073, there is used as the material of a negative electrode a carbon compound material which is formed in such a manner that the surface of a high-crystalline carbon particle forming a core is coated with a film including a VIII-group metal element and the resultant structure is further coated with carbon. It is shown by the JP-A-5-299073 that the carbon material on the surface having the disturbed-layer structure assists the intercalation of lithium and the increased surface area results in a remarkable improvement in charge/discharge capacity and charge/discharge rate. On the other hand, in the JP-A-2-121258, there is used as the material of a negative electrode a mixture of a carbon material which has H/C (a Hydrogen/Carbon mole ratio) smaller than 0.15, a face-to-face dimension larger than 3.37 Å and a crystal grain size or crystallite size Lc smaller than 150 Å in a C-axis direction and a metal which is capable of being alloyed with lithium. It is shown by the JP-A-2-121258 that a charge/discharge cycle life is elongated and a charge/discharge characteristic in a large current is satisfactory. In either the lithium secondary battery disclosed by the JP-A-5-299073 or the lithium secondary battery disclosed by the JP-A-2-121258, however, the composition of the carbon material of the negative electrode is difficult. Also, the theoretical capacity of carbon is not achieved and hence an output density is insufficient. The use of such a lithium secondary battery in an electric automobile or motor bicycle is difficult because of the insufficiency of the energy density and the output density.

SUMMARY OF THE INVENTION

As mentioned above, in the case where the carbon material or the carbon compound material is used as the negative electrode of a lithium secondary battery, there are the problem that the theoretical capacity of carbon is not achieved and the problem that the fabrication of the electrode is difficult.

An object of the present invention made for solving those problems is to provide a negative electrode using a carbon material including carbon particles carrying fine particles of a metal capable of being alloyed with lithium, thereby providing a lithium secondary battery which has a high capacity and an excellent charge/discharge cycle characteristic and a system which uses such a lithium secondary battery.

Through various examinations for solving the above-mentioned problems, the present inventors have completed the present invention on the basis of the following knowledge.

FIG. 1 shows the result of measurement of the charge/discharge cycle characteristics of a lithium secondary battery which uses the conventional negative electrode and a lithium secondary battery which uses an improved negative electrode. A method of fabricating the negative electrode used in the measurement shown in FIG. 1 is as follows. Natural graphite subjected to a thermal treatment for high purification and having a particle size of about 11 μm was used as carbon. This carbon and a solution including ethylene propylene terpolymer (hereinafter abbreviated to EPDM) as a binder dissolved in diethylbenzene were used to form a paste so that the weight ratio of carbon to EPDM is 94:6. On one hand (or in order to obtain the conventional negative electrode), the paste was applied on a copper foil of 20 μm thickness which serves as a current collector. On the other hand (or in order to obtain the improved negative electrode), the paste was filled into a foam copper member of 0.9 mm thickness which has a three-dimensional mesh structure with the opening rate (or porosity) of 93% and serves as a current collector. Each of the resultant structures was air-dried and was thereafter dried at 80° C. for 3 hours in a vacuum condition. Then, each structure was shaped at the pressure of 0.5 ton/cm$^2$ and was thereafter dried at 150° C. for 2 hours in the vacuum condition, thereby providing the conventional negative electrode and the improved negative electrode. FIG. 1 shows the result of a cycle test conducted for a test cell fabricated by using the above-prepared negative electrode in combination with a counter electrode of a lithium metal and a porous polypropylene film as a separator and using 1MLiPF$_6$/ethylene carbonate (hereinafter abbreviated to EC) plus 1, 2-dimethoxyethane (hereinafter abbreviated to DME) as an electrolytic solution and a lithium metal as a reference electrode. The conducted cycle test was such that the charge/discharge rate is 120 mA per one gram of carbon and the upper and lower limit potentials of charge/discharge are 0.1 V and 0.01 V, respectively. In FIG. 1, the discharge capacity of the conventional negative electrode is shown by curve 1 and that of the improved negative electrode is shown by curve 2.

As apparent from FIG. 1, the discharge capacity of the conventional negative electrode is deteriorated for each cycle and the discharge capacity thereof after 500 cycles is deteriorated by 37% as compared with the initial discharge capacity. On the other hand, the proportion of deterioration of the discharge capacity of the improved negative electrode is very small or 4.5% even after 500 cycles. Namely, the effect of improvement of a current collector can be appreciated in the improved negative electrode. From this experimental result, it may be considered that the deterioration of the collecting effect between carbon particles caused by the blistering of the electrode due to a change in volume by the repetition of charge/discharge and so forth can be suppressed in the improved negative electrode having the three-dimensional mesh structure.

For verification of this, the following experiment has been conducted. Namely, there is made the examination of whether or not a similar effect is obtained when metal fibers are added into a negative electrode compound layer. The result of this experiment is shown in FIG. 2. The experiment in FIG. 2 is approximately the same as that in FIG. 1. Artificial graphite having a particle size of about 3 μm was used as carbon. This carbon and copper filers having a fiber diameter of 10 μm are mixed at the weight ratio of 90:10. The mixture and polyvinylidene fluoride (hereinafter abbreviated to PVDF) as a binder dissolved in an N-methylpyrolidone solution were used to form a paste so that the weight ratio of the mixture to PVDF is 90:10. The paste was applied on a copper foil of 20 μm thickness which serves as a current collector. The resultant structure was air-dried and was thereafter dried at 80° C. for 3 hours in a vacuum condition. Then, the structure was shaped at the pressure of 0.5 ton/cm$^2$ and was thereafter dried at 120° C. for 2 hours in the vacuum condition to provide a negative electrode. Curve 3 of FIG. 2 shows the result of a charge/discharge cycle test conducted at the charge/discharge rate of 120 mA per one gram of carbon and with the upper and lower limit potentials of 0.1 V and 0.01 V for a test cell fabricated by using the above-prepared negative electrode in combination with a counter electrode of a lithium metal and a porous polypropylene film as a separator and using 1MLiPF$_6$/ethylene carbonate (EC) plus dimethyl carbonate (hereinafter abbreviated to DMC) as an electrolytic solution and a lithium metal as a reference electrode. The obtained result is shown by curve 3 in FIG. 2. For comparison, the characteristic of a cell fabricated in a similar manner but by use of a negative electrode added with no copper powder (or copper fiber) is also shown by curve 4 in FIG. 2. As apparent from FIG. 2, it has been revealed that the negative electrode added with the copper powder or fibers has a larger discharge capacity as compared with the negative electrode added with no copper powder or fiber and the deterioration of the discharge capacity for each cycle is remarkably small.

From the above result, it has been found out that the enhancement of the current collecting ability of the negative electrode compound layer is a factor important for the improvement in discharge capacity and cycle characteristic. Also, from the result of the further detailed examination, it has been found out that not by mixing conductive power or fibers with carbon but by causing carbon to carry fine particles of a metal forming an alloy with lithium, an effect equivalent to that in the mixing system is obtained even with a small adding (or carrying) amount of fine metal particles and there are provided novel functions that the capacity of alloying of metal with lithium can be utilized and the improvement in electric conductivity and thermal conductivity can be expected due to the interposition of metal between carbon particles.

The gist of the present invention will now be mentioned in the following.

According to a first aspect of the present invention, there is provided a secondary battery using system comprising at least one of a heat source, a motive power, a control circuit, a driving circuit, an LSI and an LC display element having a capacity of 0.5 Wh to 50 KWh, in which a negative electrode of at least one cell of the secondary battery is composed of a carbon material including carbon particles carrying a metal which forms an alloy with lithium, and the secondary battery is capable of discharge with an output of an energy density which is not lower than 350 W/kg.

It is preferable that the carbon particles have a face-to-face dimension ($d_{002}$) by an X-ray diffraction method which is 3.354 to 3.369 Å, a crystallite size or crystal grain size (Lc) in a C-axis direction which is not smaller than 300 Å and a specific surface area which is between 0.1 and 30 m$^2$/g.

It is preferable that the metal forming an alloy with lithium has a particle size which is not larger than 1000 Å.

According to a second aspect of the present invention, there is provided an electric automobile using a secondary battery using system provided with a motor driven by a secondary battery as a power source, in which the secondary battery is capable of quick discharge in a time which is not longer than one hour, a possible travel distance of the electric automobile for one charge at the automobile speed of 40 km/h is not shorter than 300 km, and the weight of the secondary battery is not greater than 200 kg.

According to a third aspect of the present invention, there is provided a motor bicycle using a secondary battery using system provided with a motor driven by a secondary battery as a power source, in which the secondary battery is capable of quick discharge in a time which is not longer than one hour, a possible travel distance of the motor bicycle for one charge is not shorter than 20 km, and the weight of the secondary battery is not greater than 5 kg.

It is preferable that the secondary battery used in the electric automobile in the second aspect or the motor bicycle in the third aspect is a lithium secondary battery having a negative electrode composed of a carbon material including carbon particles carrying a metal which forms an alloy with lithium, and the lithium secondary battery has an energy density not lower than 300 Wh/l.

According to a fourth aspect of the present invention, there is provided a lithium secondary battery comprising a negative electrode composed of a carbon material including carbon particles carrying a metal which forms an alloy with lithium, the carbon particles having a face-to-face dimension ($d_{002}$) by an X-ray diffraction method which is 3.354 to 3.369 Å and a crystal grain size (Lc) in a C-axis direction which is not smaller than 300 Å.

According to a fifth aspect of the present invention, there is provided a lithium secondary battery comprising a negative electrode composed of a carbon material including carbon particles carrying a metal which forms an alloy with lithium, the carbon particles having a specific surface area which is between 0.1 and 30 m$^2$/g.

According to a sixth aspect of the present invention, there is provided a lithium secondary battery comprising a negative electrode composed of a carbon material including carbon particles carrying a metal which forms an alloy with lithium, the carbon particles having an energy density not lower than 300 Wh/l.

According to a seventh aspect of the present invention, there is provided a carbon material including carbon particles carrying a metal which forms an alloy with lithium; the carbon particles having a face-to-face dimension ($d_{002}$) by an X-ray diffraction method which is 3.354 to 3.369 Å and a crystal grain size (Lc) in a C-axis direction which is not smaller than 300 Å.

According to an eighth aspect of the present invention, there is provided a lithium secondary battery comprising a negative electrode composed of a carbon material including carbon particles carrying a metal which forms an alloy with lithium, the carbon particles having a specific surface area which is between 0.1 and 30 m$^2$/g, and the metal having an average particle size which is not larger than 1000 Å.

According to a ninth aspect of the present invention, there is provided a secondary battery using system comprising at least one of a heat source, a motive power, a control circuit, a driving circuit, an LSI and an LC display element having a capacity of 0.5 Wh to 50 KWh, in which a negative electrode of at least one cell of the secondary battery is composed of a carbon material including carbon particles carrying a metal which forms an alloy with lithium, the carbon particles have a specific surface area which is between 0.1 and 30 m$^2$/g, and the secondary battery, when charged at 300 W/l, is capable of a discharge which is not smaller than 90% of a battery capacity and is not smaller than 200 W/l.

Namely, the present invention provides a high-performance lithium secondary battery by using the above-defined carbon material as the material of a negative electrode. The carbon material includes carbon particles which carry a metal capable of forming an alloy with lithium.

The carbon particles used in the present invention are obtained by subjecting high-crystalline carbon particles (for example, natural graphite or an easily graphitizable material obtained from petroleum coke, coal pitch coke or the like) to a thermal treatment at a high temperature equal to or higher than 2500° C. It is preferable that the average particle size of the carbon particles is not greater than 50 μm. The most preferable size is 1 to 20 μm. The configuration of the carbon particle may be a spheroidal form, a massive or block form, a scaly form, a fiber form or a pulverized version thereof.

The metal carried on the carbon particles is at least one kind of element selected from a group consisting of Al, Sb, B, Ba, Bi, Cd, Ca, Ga, In, Ir, Ge, Pb, Hg, Si, Ag, Sr, Te, Tl and Sn. It is preferable that the metal element also satisfies the following conditions: (1) it provides an alloy composition having a large content of lithium; (2) the atomic weight is relatively small and the density is relatively high; (3) the reduction is easy; (4) the oxidation/reduction potential of an alloy thereof with lithium is low; (5) the waste disposal or dumping treatment is easy or not difficult; and (6) the cost is relatively low.

A method of carrying the metal particles may include a deposition or evaporation method, a sputtering method, a wet reduction method, an electrochemical reduction method, a plating method and a vapor phase reductant gas processing method. A proper carrying method is applicable corresponding to the kind of a metal which is to be used. It is preferable that the addition amount or carrying amount of the metal particles is not greater than 30 weight %. The most preferable amount is 1 to 10 weight %. When the rate of deposition or precipitation and dissolution of a lithium alloy upon charging/discharging is taken into consideration, it is preferable that the particle size of the carried metal is not larger than 1000 Å.

When a negative electrode is fabricated using the carbon material thus obtained, a binder is used. No special limitation is imposed on the binder so long as it does not react with an electrolytic solution used. The binder may be, for example, EPDM, PVDF or polytetrafluoroethylene. It is preferable that the proportion of the binder to carbon is 1 to 30 weight %. The most preferable proportion is 5 to 15 weight %. The form of the negative electrode using the above-mentioned compound can be adapted to a battery form by configuration into, for example, a sheet-like form, a film-like form, a film-like form on a metal foil or a filled form into a foam metal. It is preferable that the thickness of the compound layer is 10 to 200 μm.

An optimum lithium secondary battery can be provided by using the thus obtained negative electrode in combination with a positive electrode, a separator and an electrolytic solution which are generally used. An active substance used for the positive electrode may be a compound oxide such as $LiCoO_2$, $LiNiO_2$ or $LiMn_2O_4$ which contains lithium. The active substance is mixed with carbon black or carbon as a conductor material and a binder. The mixture is applied on a current collector such as an Al foil to provide a positive electrode.

The separator can be made of a porous polypropylene, polyethelene or polyolefine-series film. The eletrolytic solution may be a mixed solvent of at least two kinds selected from propylene carbonate (PC), EC, DME, DMC, diethyl carbonate (DEC), methyl ethyl carbonate (MEC) or the like. An electrolyte, which may be $LiPF_6$, $LiBF_4$, $LiClO_4$ or the like, is dissolved in the solvent.

By thus providing the negative electrode for lithium secondary battery by use of a carbon material composed of carbon particles carrying fine particles of a metal forming an alloy with lithium in order to make an increase in discharge capacity, an improvement in output density and an improvement in cycle characteristic, it becomes to possible to make (1) the increase in discharge capacity, (2) an improvement in electric conductivity, (3) a reduction in irreversible capacitance, (4) the improvement in output density, (5) the improvement in cycle characteristic, (6) an improvement in heat dissipation ability in the case of a combinational battery, and (7) a quick charge/discharge.

DESCRIPTION OF THE PREFERRED EMBODIMENTS

Figure 1:
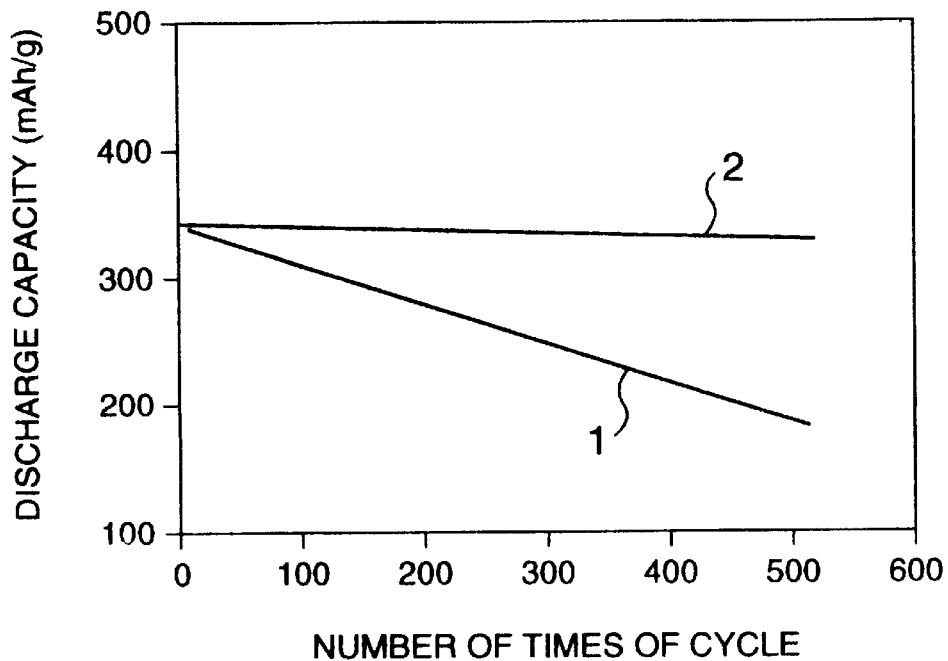
FIG. 1 is a diagram showing the cycle characteristics of the conventional negative electrode and an improved negative electrode.
Figure 2:
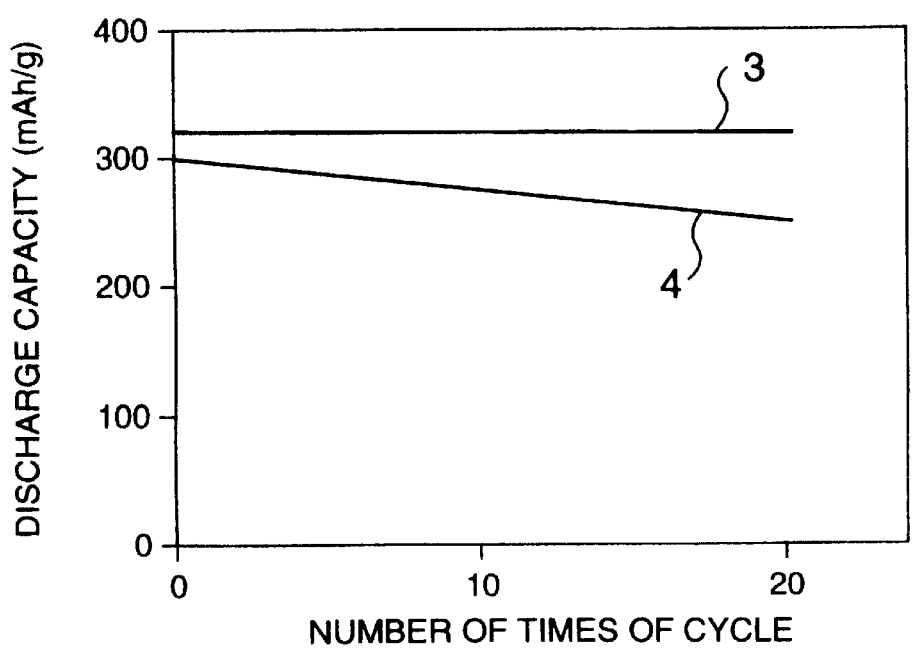
FIG. 2 is a diagram showing the cycle characteristics of a negative electrode added with copper fibers and a negative electrode added with no copper fiber.

Embodiments of the present invention will now be explained.

Embodiment 1

Natural graphite of 9.0 g subjected to a treatment for high purification and having a particle size of 11 μm was suspended in a water of 450 ml containing ethyl alcohol of 25 ml. The suspension was heated to about 60° C. and silver nitrate ($AgNO_3$) of 1.73 g was added to the suspension with strong agitation so that the silver nitrate is dissolved in the suspension. An aqueous solution of sodium tetrahydriborate ($NaBH_4$) in 0.5 weight % was dropped into the resultant suspension so that a reducing reaction is completed extending over about 3 hours. After the subsequent filtration and rinsing, vacuum drying was conducted at 300° C. for 6 hours. As the result of chemical analysis, the carrying or addition amount of obtained powder A was satisfactory or 9.9 weight % for 10.0 weight % in the charge composition. As the result of the investigation of the existing condition of Ag by X-ray diffraction, only the diffraction line of Ag in a metal state was detected. Next, through the observation of the dispersion condition of Ag by energy partition or distributed electronic probe microanalysis, it was found that the Ag particles are distributed over the entire surface of the graphite particles and a number of Ag particles are enriched at the end face portion of the graphite particle. Further, through the observation of the size of the Ag particles by a transmission type electron microscope, it was found out that the particles having the size of several-hundred angstroms are dispersed with a substantially uniform distribution.

Embodiment 2

Artificial graphite of 9.0 g having a particle size of 3 μm was suspended in a commercially available tinning solution (GLS-500B made by Koujundokagaku) of 500 ml. The suspension was agitated while being heated to about 65° C. so that tin (Sn) is electroless-plated on carbon particles. After the subsequent filtration and rinsing, vacuum drying was conducted at 300° C. for 6 hours to obtain a powder B. As the result of chemical analysis, the carrying amount of Sn was 4.6 weight %.

Embodiment 3

Natural graphite of 9.0 g subjected to a treatment for high purification and having a particle size of 11 μm was suspended in a water of 450 ml containing ethyl alcohol of 25 ml. The suspension was heated to about 60° C. and bismuth nitrate $(Bi(NO_3)_3 \cdot xH_2O)$ of 2.32 g was added to the suspension with strong agitation so that the bismuth nitrate is dissolved in the suspension. A (1:4) aqueous ammonia was dropped into the resultant suspension by use of a microtube pump until the solution becomes alkaline. After the subsequent filtration and rinsing, vacuum drying was conducted at 300° C. for 6 hours. This powder was subjected to a reducing treatment at 600° C. for 3 hours in a helium gas flow containing hydrogen of 4 volume %, thereby obtaining a powder C. Through the chemical analysis of the powder C, the analysis result of 9.6 weight % was obtained for 10.0 weight % in the charge composition.

Embodiment 4

Each of the powders A, B and C obtained in the embodiment 1, 2 and 3 and PVDF as a binder dissolved in an N-methylpyrolidone solution were used to form a paste so that the weight ratio of each powder to PVDF is 90:10. The paste was applied on a copper foil of 20 μm thickness which serves as a current collector. The resultant structure was air-dried and was thereafter dried at 80° C. for 3 hours in a vacuum condition. Then, the structures for the powders A, B and C were shaped at the pressure of 0.5 ton/cm$^2$ and were thereafter dried at 120° C. for 2 hours in the vacuum condition to obtain negative electrodes A, B and C. Test batteries or cells were fabricated by combining each of the negative electrodes A, B and C with a counter electrode of a lithium metal through a polyester film and using 1MLiPF$_6$/EC+DMC as an electrolytic solution and a lithium metal as a reference electrode, respectively. A cycle test was conducted under the condition that the charge/discharge rate is 80 mA per one gram of carbon and the upper and lower limit potentials of charge/discharge are 0.1 V and 0.01 V, respectively. The obtained result of test is shown in Table 1 together with comparative carbon powder examples carrying no metal.

TABLE 1

| Negative electrode material powder | Discharge capacity at 1st cycle (mAh/g) | Discharge capacity at 20th cycle (mAh/g) |
|---|---|---|
| Powder A | 340 | 395 |
| Powder B | 335 | 382 |
| Comparative | 300 | 295 |
| Example Powder C | 320 | 375 |
| Comparative Example | 300 | 250 |

Figure 3:
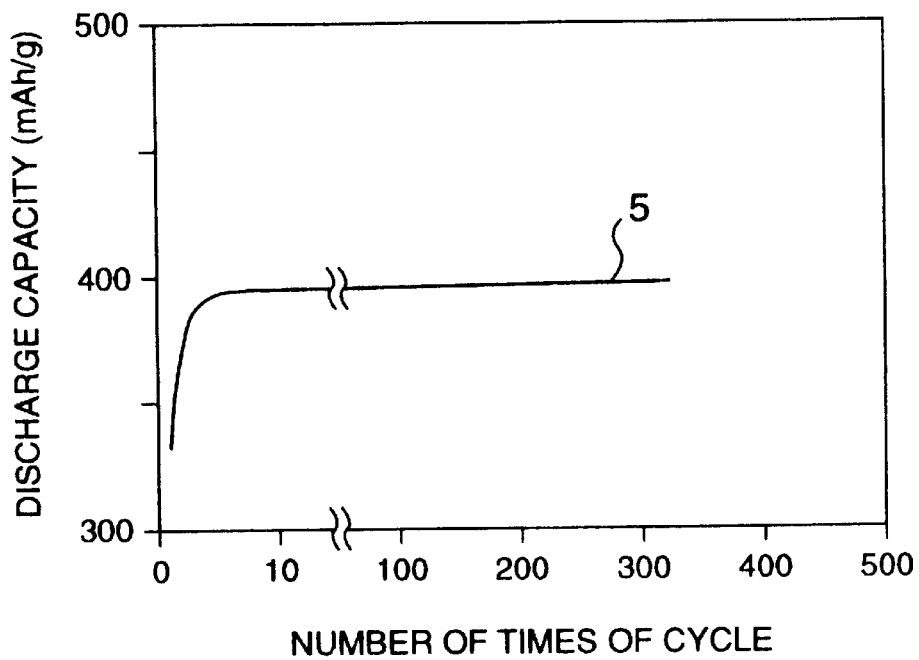
FIG. 3 is a diagram showing the cycle characteristic of a negative electrode according to an embodiment of the present invention.

Each of the powders A, B and C exhibited a value exceeding the theoretical capacity density 372 mAh/g of graphite. This is because the capacity of alloying of metal and lithium is added. The result of a cycle test conducted for the negative electrode A is shown by curve 5 in FIG. 3. The discharge capacity of 395 mAh/g was maintained even after 300 cycles.

Embodiment 5

The evaluation was made of a SUM-3 battery constructed using the negative electrode A obtained in the embodiment 4, a positive electrode made of lithium cobaltate (LiCoO$_2$), a separator made of a polyester film and 1MLiPF$_6$/EC+DMC as an electrolytic solution. The present battery exhibited the discharge capacity of 350 Wh/l in the first cycle and this value was not deteriorated even after 130 cycles.

Figure 4:
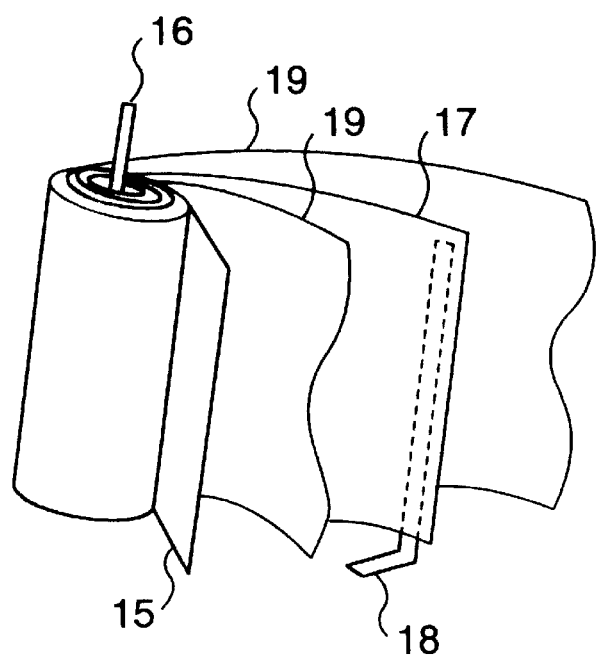
FIG. 4 is a view showing an example of the construction of a cylindrical battery according to the present invention.

FIG. 4 is a view for explaining an example of the construction of a battery fabricated according to the present invention. The shown battery is cylindrical. Reference numeral 15 denotes a positive electrode, numeral 16 a terminal connected to the positive electrode, numeral 17 a negative electrode which may the negative electrode provided according to the foregoing embodiment, numeral 18 a terminal connected to the negative electrode, and numeral 19 a separator interposed between the positive electrode and the negative electrode.

The following effects are obtained by using a negative electrode provided according to the present invention, that is, a negative electrode composed of a powder material including carbon particles carrying fine particles of a metal which forms an alloy with lithium. Namely, with the interposition of the metal between the carbon particles, (1) the electric conductivity is improved and the rate of a charging/discharging reaction is improved. (2) Since the charge/discharge capacity of the alloy formed by the added metal and lithium can be utilized, a value exceeding the theoretical capacity 372 mAh/g of graphite can be obtained. (3) Since a reaction site on the carbon particle surface causing an irreversible capacitance is coated with the carried metal, the irreversible capacitance is reduced. (4) Since the discharge capacity becomes large, the output density of the battery becomes naturally large. (5) The cycle characteristic is improved in association with the effect (1), thereby making it possible to improve the heat dissipation ability in the case of a combinational battery.

What is claimed is:

1. A lithium secondary battery comprising a positive electrode, a negative electrode, and a separator and electrolyte provided between said positive electrode and said negative electrode, wherein said negative electrode is made of crystalline carbon particles and a metal which forms an alloy with lithium, said crystalline carbon particles having an average particle size of 1–20 μm, and said metal forming an alloy with lithium having a particle size of not more than 1000 Å.

2. A lithium secondary battery according to claim 1, wherein said crystalline carbon particles have a face-to-face dimension ($d_{002}$) by an X-ray diffraction method which is 3.354–3.369 Å, and a crystal grain size (Lc) in a C-axis direction which is not smaller than 300 Å.

3. A lithium secondary battery according to claim 1, wherein said metal forming an alloy with lithium is Ag.

4. A lithium secondary battery according to claim 1, wherein said metal forming an alloy with lithium comprises at least one element selected from the group consisting of Al, Sb, B, Ba, Bi, Cd, Ca, Ga, In, Ir, Ge, Pb, Hg, Si, Ag, Sr, Te, Tl and Sn.

5. A lithium secondary battery according to claim 1, wherein said metal forming an alloy with lithium comprises at least one element selected from the group consisting of Ag, Sn and Bi.

6. A lithium secondary battery according to claim 1, wherein said metal forming an alloy with lithium is contained in said negative electrode in an amount not greater than 30 weight %.

7. A lithium secondary battery according to claim 1, wherein said metal forming an alloy with lithium is contained in said negative electrode in an amount from 1 weight % to 10 weight %.

8. A lithium secondary battery according to claim 1, wherein said metal forming an alloy is dispersed in said crystalline carbon particles and is enriched at an end face portion of said crystalline carbon particles.

* * * * *